INVENTOR
EDGAR S. STODDARD

BY

ATTORNEY

Jan. 12, 1960     E. S. STODDARD     2,920,969
METHOD AND MEANS FOR IRRADIATING FOODS
Filed Aug. 25, 1954                           5 Sheets-Sheet 3

INVENTOR
EDGAR S. STODDARD

Andrew G. Hubbard

ATTORNEY

Jan. 12, 1960   E. S. STODDARD   2,920,969
METHOD AND MEANS FOR IRRADIATING FOODS
Filed Aug. 25, 1954   5 Sheets-Sheet 4

INVENTOR
EDGAR S. STODDARD
BY Andrew B. Anderson
ATTORNEY

Jan. 12, 1960 E. S. STODDARD 2,920,969
METHOD AND MEANS FOR IRRADIATING FOODS
Filed Aug. 25, 1954 5 Sheets-Sheet 5
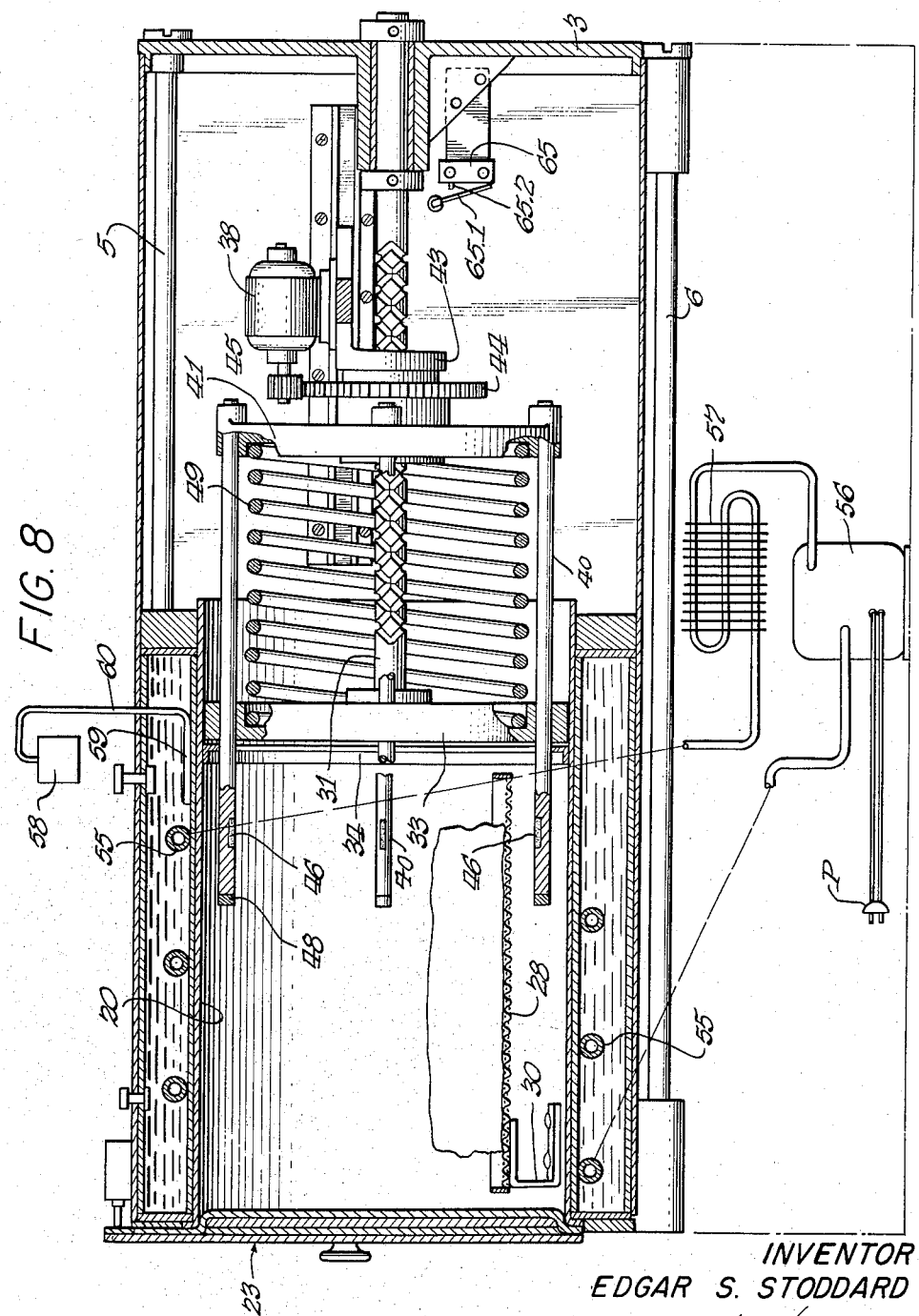
INVENTOR
EDGAR S. STODDARD
BY
ATTORNEY

United States Patent Office 2,920,969
Patented Jan. 12, 1960

2,920,969

METHOD AND MEANS FOR IRRADIATING FOODS

Edgar S. Stoddard, Berwyn, Ill., assignor to General Electric Company, a corporation of New York Application August 25, 1954, Serial No. 452,053

15 Claims. (Cl. 99—217)

This invention relates to the method and means for prolonging the storage life of fresh foods such as chopped meat, fresh vegetables and fruits, which even though kept under normal refrigeration will in a matter of a few days become unfit for human consumption in the raw or in the cooked state.

It is well known that many types of fresh foods "spoil" after a short period of storage in the usual domestic refrigerator, even though the fresh food storage chamber is at an average temperature of about 36° F. Enzymic action in such foods, and the resulting soft, watery cell and tissue condition of the foods, is slowed at this temperature, but is, of course, not eliminated. A bruise or other physical damage to the cells of the foods permits the watery fluids to reach the surface; and bacteria and mold fungi, which are always present on the surface of the foods appear to be nurtured by such fluids. Once bacterial and mold growth begins, spoilage of the foods proceeds at a rapid rate. It is therefore not enough merely to keep foods at the normal refrigeration temperature for fresh foods, or to rely on the high-humidity atmosphere of closed compartments. I have determined, however, that food storage life can be increased by several hundred percent by inhibiting bacterial and mold growth by the combination of refrigeration and prolonged exposure to low-intensity ionizing radiation.

It is therefore an object of the invention to provide means for refrigerating and safely irradiating fresh foods to retard the growth and development of bacteria and mold on the surfaces of, and to some extent within, fresh foods.

It is another object of the invention to prolong the useful storage life of foodstuffs by means of refrigeration in combination with periodic exposure to relatively low-intensity ionizing radiation.

It is a further object of the invention to provide a combination food storage and irradiation chamber.

It is yet another object of the invention to provide an ionizing radiation chamber for the storage of foods in which the user of the apparatus is at all times adequately protected from the emissive materials.

It is another object of the invention to provide means for periodically subjecting stored foodstuffs to the bacterial and mold inhibiting action of ionizing radiation.

Although apparatus as disclosed herein may be amplified for the complete sterilization of foodstuffs, it is contemplated that its most useful field of operation is for small-dosage irradiation capable of retarding bacterial and mold growth and thus prolonging the storage life of foodstuffs for a matter of several weeks. In a presently preferred embodiment of the invention, I provide a food storage chamber which is refrigerated either in the sense of being adaptable for insertion within a refrigerated chamber or having its own refrigeration unit capable of maintaining a food storage temperature in the usual 34–36° F. range. A shelf within the storage chamber is arranged to support the foodstuffs in spaced relation to the walls of the container. Means are disposed in a compartment remote from the storage chamber to cause bodies of ray-emissive material to advance within the chamber in a manner exposing all sides of the foodstuffs to ionizing rays and then, as part of the same operating cycle, continuing the envelopment of the foodstuffs during the withdrawal of the radiant material to its original position. The operation of the apparatus may be under manual control; time control establishing regular periods of operation; or in apparatus designed for use in a conventional compressor-condenser-evaporator refrigerator system, may be arranged to cycle during each cycle of operation of the compressor. It is a feature of the invention that the access door of the food storage compartment is arranged to actuate a control switch in the apparatus drive circuit to make it impossible to cause the radiant material to enter the storage chamber while the door is open; and as a further safety measure, latch means are provided to maintain the door locked until the radiant material has withdrawn. It is a further feature of the apparatus that means is provided to move the radiant material to a relatively harmless position in the event of electric power failure during an operating cycle.

Other features and advantages will be apparent from the following detailed description of the invention, read in connection with the accompanying drawings in which:

Fig. 8 is a somewhat schematic representation of an embodiment of the invention in which the insulation chamber about the food treatment compartment contains refrigeration means.

General description

Figure 1:
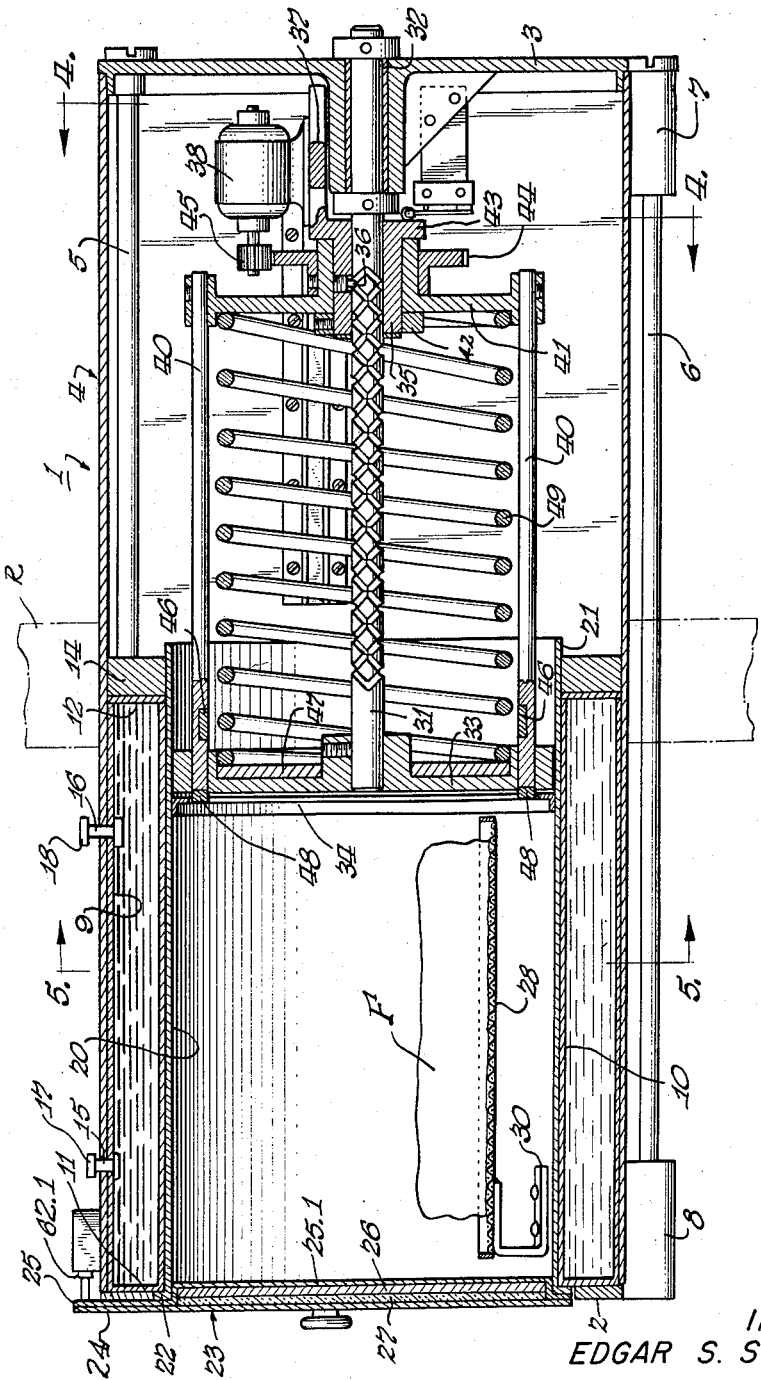
Fig. 1 is a side sectional elevation of a food treatment device embodying the invention.
Figure 4:
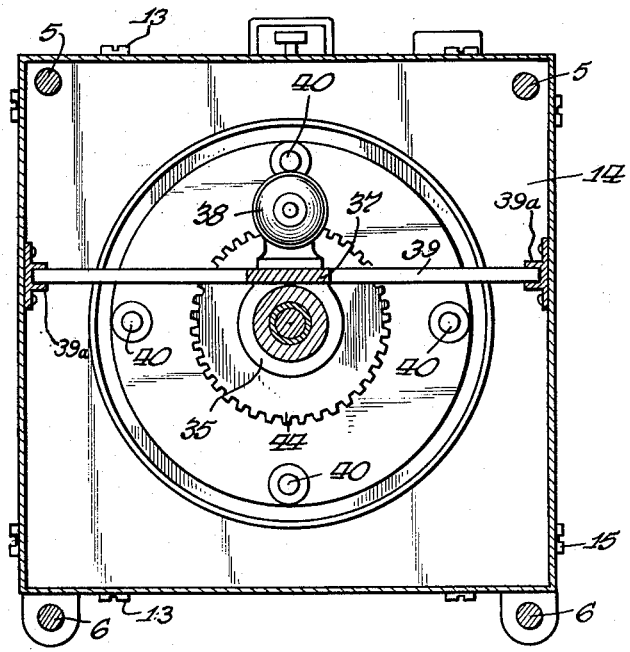
Fig. 4 is a vertical section taken on lines 4—4 of Fig. 1.

A presently preferred form of food treatment apparatus, as shown in Fig. 1, comprises a housing 1 which may be generally of box-like shape in which front and rear end plates 2, 3 confine between them the four walls of the body portion 4. Any suitable means may be used to integrate the six walls into a rigid box-like structure; I have shown, for example, upper and lower pairs of tie rods 5,6 extending between the respective end plates. The bottom tie rods may advantageously pass through the foot portions 7, 8 which form part of the end plate structures. Said bottom tie rods are therefore externally located. The upper tie rods are advantageously disposed within the housing, as indicated in Fig. 4. It will be understood that the tie rods may have threaded ends which secure within tapped openings (not shown) of front wall structures such as the foot portions 8 at the lower portion of the housing, and equivalent structures (not shown) of the upper portion.

Within the housing at the front portion thereof is a cylindrical insulation vessel defined by the concentric cylinders 9, 10 which are preferably of a material resistant to corrosion by water. Aluminum is a satisfactory material, although the lead surfacing of terne plate provides additional insulation against passage of ionizing rays. In combination with the end walls 11, 12 which may be welded or otherwise secured thereto, the cylinders define the annular insulation chamber. A rigid structural plate 14 may be secured within the casing by any suitable means such as the plurality of machine screws 13 indicated in Fig. 4. As shown, the upper tie rods 5 pass through the plate 14. The space between the cylinders 9 and 10 is arranged to be permanently filled with a liquid capable of insulating against the passage of gamma rays. In consideration of the fact that the apparatus is intended to be used in a refrigerated space, the liquid may comprise an ethylene glycol solution having a freezing point suitably below the freezing point of water. The chamber may be filled through one or the other of the fill vent tubes 15, 16 passing through the housing 4 and the cylinder 9. It being understood that the uppermost panel of the housing may be applied over the said tubes 15, 16. The tubes are arranged to be closed after filling by suitable caps 17, 18.

Figure 3:
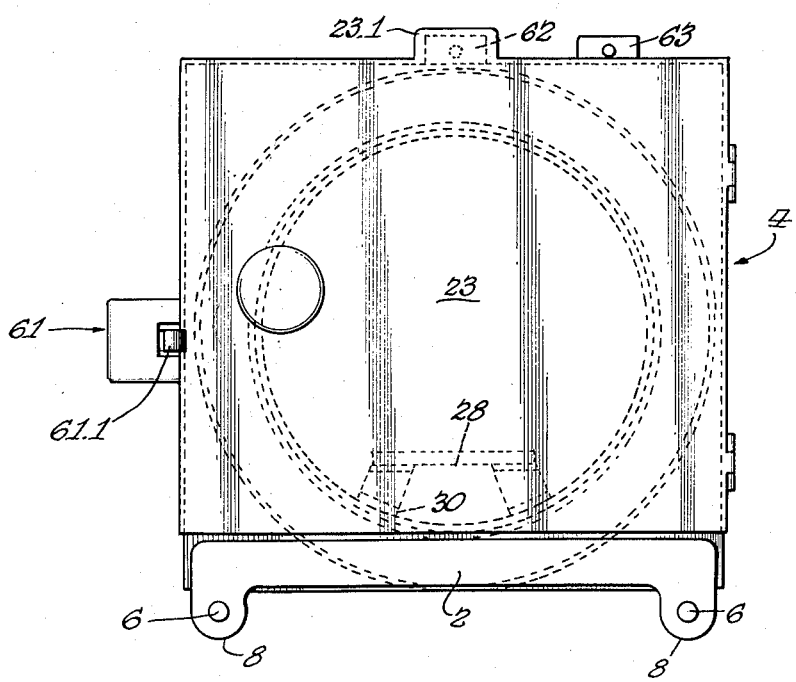
Fig. 3 is a front elevation thereof.

The treatment chamber has an insulating wall. Advantageously, said chamber is defined by the lead cylinder 20 within the cylinder 10; said cylinder 20 extends well beyond the right end of cylinder 10 as viewed in Fig. 1, to provide the insulating skirt 21, and at its forward end cylinder 20 is flanged as at 22 to provide a seat for the hinged door 23. Said door is advantageously a composite structure hinged at one side to the front panel 2, as shown in Fig. 3, and may include an exterior plate 24 of stainless steel or the like and a lead facing plate 25 having a circular dished portion 25.1 which enters the food treatment chamber in relatively snug relation to the lead wall 20 of said chamber. The space between the outer plate 24 and the portion 25.1 is advantageously occupied by additional insulation, as indicated by the lead plate 26 and thermal insulation 27.

Figure 5:
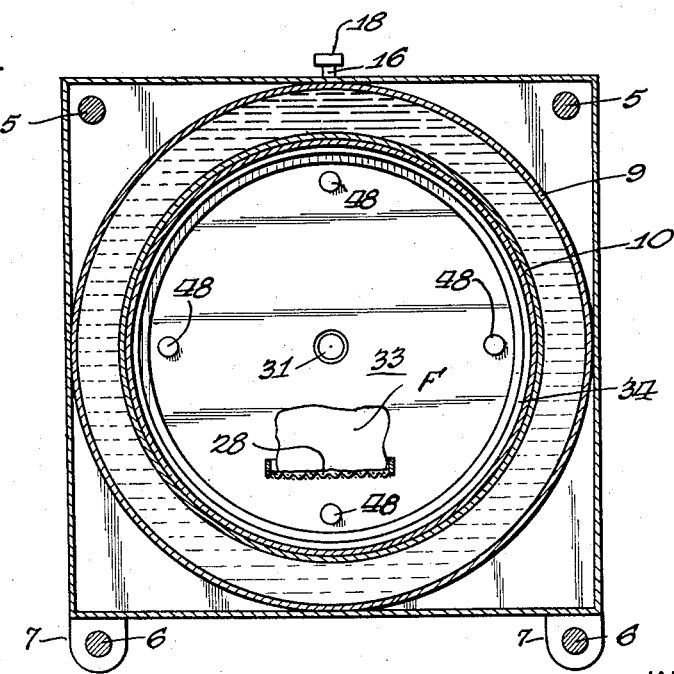
Fig. 5 is a vertical section taken on lines 5—5 of Fig. 1.

A shelf 28 is provided for the support of the foodstuff F. The shelf must interpose minimum obstruction to the ionizing rays; advantageously shelf 28 may be a woven wire structure utilizing a cantilever support such as spaced members 30 secured to the shelf and to the floor of the treatment chamber. The shelf is therefore arranged to support the food in spaced relation to the side walls of the treatment chamber, as indicated in Fig 5.

The foodstuffs on the shelf 28 are irradiated by means of the passage into and out of the treatment chamber of bodies of low-intensity ray-emissive material. Because of the deep penetration thereof gamma rays appear most advantageous and therefore capsules of a cobalt isotope such as cobalt-60 may be employed. However, beta rays, although of substantially lower penetrating capacity, produce surface ionization which is a mold and bacteria inhibitor. It is therefore within the scope of the invention to use gamma and beta ray emitters alone or in combination.

A relatively simple mechanism for effecting the desired travel of the emissive material is shown in Figs. 1 and 4. An endless-feed screw 31 is journalled for free rotation in a bearing 32 provided at the rear end plate 3. Attached to the opposite end of screw 31 is a drive plate 33 which rotates within the cylinder 20 with small clearance therebetween. Said plate 33 is adjacent the fixed angle member 34 which may function as a forward thrust bearing. A sleeve 35 is slidable along screw 31 and is provided with a pin 36 which engages with the screw. Said sleeve has affixed thereto a carriage 37 for the drive motor 38. As best shown in Fig. 4, carriage 37 has stabilising outriggers 39 which ride in the longitudinal rails 39a affixed to the opposite walls of the housing. Rotation of screw 31 to effect the forward and rear motion of the radiant material is accomplished by the means which carry said material. For example, a plurality of rods 40 are arranged to pass slidably through openings in the drive plate 33 and are secured at their opposite ends to a plate or spider 41 which is free to rotate about sleeve 35, being confined thereon between the collar 42 and the flange 43. In order to achieve smoothness of driving effort, it is preferable that there be at least two of said drive rods 40, and of course it may be advantageous to use more than two disposed symmetrically relative to the screw 31. A gear 44 is securely fastened to the hub or spider 41 and is in continuous engagement with the drive pinion 45 fixed to the motor shaft.

It will be obvious that so long as the motor 38 is energized, the rotation of plate or spider 41 will be transmitted through rods 40 to drive plate 33. The latter plate will be rotated causing the rotation of screw 31 and the travel of the entire drive mechanism from one end to the other of the screw.

Each drive rod may serve as a carrier for a capsule or other container of the radiant material. For example, the rods may carry aluminum capsules 46 each containing a quantity of cobalt-60, which is an efficient gamma ray emitter; one or more of the rods may serve as a carrier for a suitable container of carbon-14 which is typical of the beta ray emissive materials now available. The capsules or other charges of radiant material are preferably disposed so that at the end of an operating cycle, the capsules are always completely withdrawn from the treatment chamber and will be within the lead shield provided by the extension 21 of the lead wall 20 of the chamber. Additionally, the capsules are behind the relatively heavy lead shield 47 affixed to the rear of plate 33. The ends of the rods 40 may be fitted with lead plugs 48.

From the foregoing, it will be clear that the radiant material will travel in a helical path about the foodstuff carried by the shelf 28, both during the advance and the retraction of the drive mechanism.

For positive retraction of the rods 40 in the event of power failure at a time when the rods were in a forward position, a coil spring 49 of suitable capacity is disposed between the drive plate 33 and the plate or spider 41. During the forward movement of spider 41, the spring becomes compressed and is therefore available to drive the mechanism rearwardly to its fully retracted position.

Figure 6:
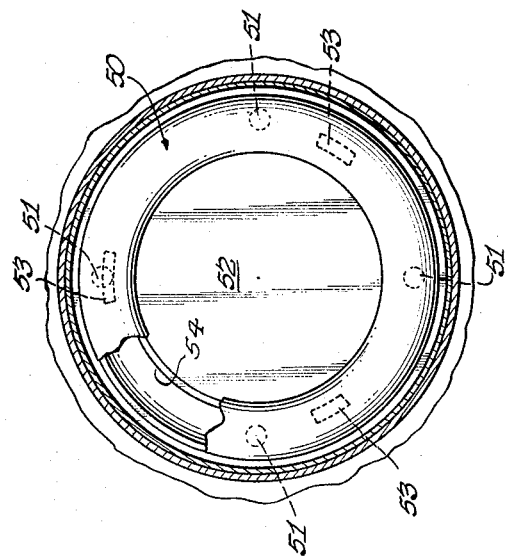
Fig. 6 is a fragmentary vertical elevation of a second form of radiation device.
Figure 7:
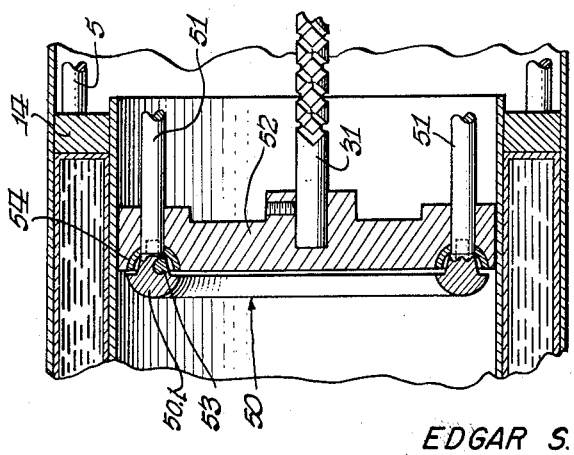
Fig. 7 is a fragmentary side sectional elevation of a food treatment device utilizing the radiator of Fig. 6.

Figs. 6 and 7 show a second method of carrying the radiant substances. A ring 50 is affixed to the ends of drive rods 51, which may in all respects be similar to rods 40 except that they have no capsules or other containers of the emissive material. The inner surface of ring 50 is provided with a suitable plurality of capsules 53 or other containers of gamma and/or beta emissive material.

In view of the fact that ring 50 must at all times be on the treatment chamber side of the drive plate 52 with which the rods 51 cooperate in the manner described with respect to rods 40 and plate 33, the ray emitting material is thoroughly insulated from the treatment chamber when the ring is in its retracted position. The ring 50 may itself be of lead because it is under no driving strain or other load. Plate 52 is formed with a lead-backed groove 54 within which the ring 50 seats at the completion of the treatment. As shown, the ring 50 may itself be formed to provide the arcuate shielding portion 50.1, when the ring is seated in the groove 54, the ray emissive material is substantially completely enclosed in lead.

It will be obvious that the disposition of the radiant material about the ring 50 makes it unnecessary for the ring to rotate during its travel within the treatment chamber. However, for simplification of the description herein, it will be assumed that the same endless feed screw driving mechanism will be employed. It will of course be obvious to those skilled in the art that a simple piston mechanism or other straight line motion device may be employed to project and retract the ring 50 within the treatment chamber.

The foregoing apparatus is intended to be disposed with the food treatment chamber within the refrigerated space of a refrigerator and is arranged for passage through the wall of said refrigerator which has been shown in broken line in Fig. 1 and identified as "R." The drive mechanism is advantageously located on the exterior of the rear wall of the refrigerator.

Figure 9:
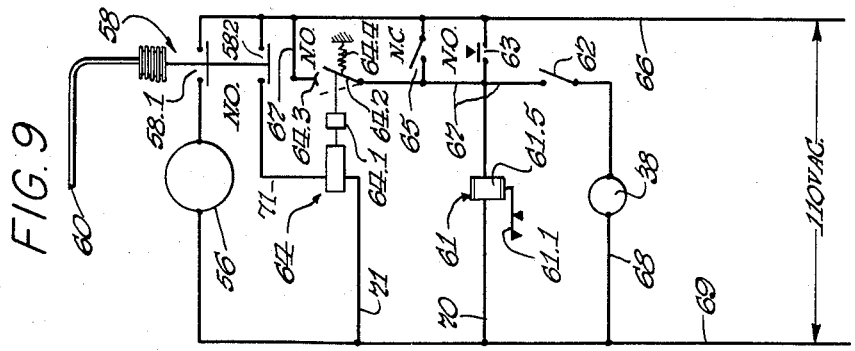
Fig. 9 is a schematic wiring diagram showing interlocking safety switches and control features.

An alternative construction is illustrated in Figs. 8, 9 in which the insulating space about the food treatment chamber contains the tubing 55 of a refrigeration evaporator connected in the usual closed cycle arrangement to refrigeration compressor 56 and condenser 57. A thermostat 58 may be of conventional pattern, with temperature sensing bulb 59 disposed within the insulating chamber and capillary tubing 60 permitting the themostat to be located at any convenient place.

The control system

The control system is essentially based on protection of the user against exposure to the radio-active rays. Under normal conditions of operation, that is to say, when there is no failure of electric power, the drive motor 38 must complete a cycle of operation thereby returning the radiant material to its shielded position rearwardly of the food treatment chamber. In the event of power failure at a time when motor 38 has moved the apparatus from its fully retracted position of Figs. 1 and 8, the spring 49 will return the motor carriage to home position. Means such as the electromagnetic latch 61 holds the door 23 closed so long as motor 38 is under power. Door 23 is in operative association with a normally open switch 62 carried by the housing 4, and as presently appears the door must be closed before motor operation can occur. A momentary contact, manually operable, normally open switch 63 is advantageously placed in the control circuit, as presently explained.

Figure 2:
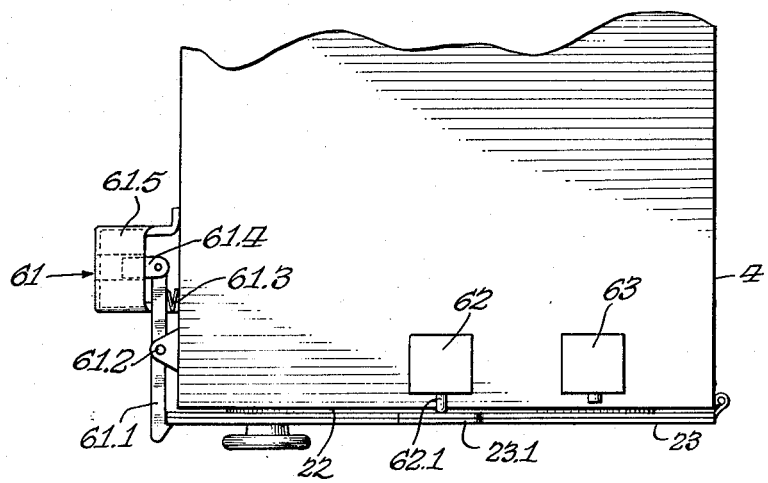
Fig. 2 is a fragmentary top plan view of the apparatus showing the electromagnetic door latch and certain control switches.

The circuit of Fig. 9 may be considered with respect to Figs. 2, 3, and 8, although it will be understood that it is equally applicable to the embodiment of Fig. 1, which, as previously described, was intended for use in a refrigerator rather than being self-refrigerated as in Fig. 8. 110 v. alternating current is made available by way of the attachment plug P in usual fashion. The operation of the motor-driven refrigeration compressor 56 is under control of contacts 58.1 of thermostat 58 in cenventional fashion. Motor 38 is, in one circuit, under control of a dash-pot or other time-delay relay 64 which derives its energy from the closing of contacts 58.2 operated by thermostat 58 in conjoint relation with contacts 58.1. Motor 38 is in a parallel electric circuit having the normally closed switch 65 and normally opened switches 62 and 63. Relay 64 has a dash-pot or other time-delay device 64.1 and its contact arm 64.2 sweeps relatively slowly across the arcuate contact 64.3 to reach a final open-circuit position. Spring 64.4 biases the contact arm 64.2 for return to a normally open position. Switch 65 is arranged to be mounted in fixed position on the rear housing member, and it is provided with a pivoted actuating arm 65.1 which is in the path of travel of the collar 35. It will be understood, of course, that suitable stop means (not shown) will be provided to prevent the arm 65.1 from falling to an inoperative position. Switch 65 may be of the single pole "microswitch" type which operates between its closed and open circuit positions with a snap action as button 65.2 is released or pressed by the arm 65.1. The amplitude of movement of button 65.2 is small and the contacts of the switch 65 will close after a very short leftward movement of the collar, as viewed in Fig. 8. Door switch 62 is of a simple single pole construction self-biased to open circuit position. Its actuating plunger 62.1 will be engaged by the plate 23.1 of door 23 as the door reaches its home position and the switch will be operated to closed circuit position thereby. Switch 63 is of simple single pole construction self-biased to open circuit position and arranged to be manually operated to closed circuit position when desired.

Door latch 61, Fig. 2, includes a latching dog 61.1 pivotally mounted as at 61.2 to a side wall of housing 4. It is biased by spring 61.3 for rotation counterclockwise of Fig. 2 and is thus normally in latching engagement with the door 23. A magnetic armature 61.4 pivotally secured to the dog 61.1 cooperates with an electromagnet 61.5, suitably supported on the side wall of the housing, To unlatch the door, it is necessary only to apply finger pressure against the sloping face of the latch dog and thus rotate it in a clockwise direction against the bias of the spring 61.3. This can be done only when the magnet 61.5 is de-energized; when energized the attraction of the armature maintains the latch in closed position.

Assume, now, that food has been placed in the treatment chamber and that the door has been latched closed. Switch 62 will be held closed by the door 23. To begin the operation of the apparatus, switch 63 may be held manually closed for a matter of a few seconds. The circuit to motor 38 will be closed through line conductor 66, switch 63, conductor 67, closed switch 62, conductor 68 and line conductor 69. As carriage 27 leaves its home position, switch 65 is released to move to closed position and a parallel motor energizing circuit is obviously established. Switch 63 may then be released to return to open circuit position without interrupting the operation of the apparatus. Magnetic latch solenoid 61.5 is simultaneously energized through the circuit including switch 65 and conductor 70. The motor 38 will cause the carriage to travel to the left end of screw 31 as viewed in Fig. 8, and then to return to home position, at which point sleeve 43 will engage switch 65 and move it to open circuit position. The motor will then stop operating. It is contemplated that the entire cycle will consume about thirty seconds and the material in the treatment chamber will have been exposed to the gamma and/or beta radiations for a somewhat lesser interval of time.

Thermostat 58 and relay 64 provide a circuit which will cause the motor 38 to cycle once each time the thermostat closes contacts 58.2 and once each time the thermostat opens contacts 58.2. This latter operation occurs unless at the time of opening said contacts the motor is already in operation. When contacts 58.2 close, an energizing circuit will be completed across solenoid 64 by means of conductor 71. The solenoid will draw the arm 64.2 across the arcuate contact 64.3 and will close the motor 38 circuit through conductors 67 and 68. Dash-pot 64.1 retards the operation of arm 64.2 sufficiently to insure that before contact arm 64.2 leaves contact 64.3 (as it will at the end of the solenoid stroke) carriage 27 will have progressed to the point where switch 65 has set up the above noted parallel circuit maintaining the motor in operation until the complete cycle has been completed. If the thermostat is still holding the contacts 58.2 closed at the completion of the cycle, there will be no further operation of the motor 38 because switch 65 will have been opened upon the return of carriage 27 to home position and solenoid 64 by that time will have moved the arm 64.2 away from contact 64.3, as indicated in the dotted line of Fig. 9. If, however, the carriage 27 has returned to home position before thermostat 58 opens the contact 58. 2, the spring 64.4 in drawing arm 64.2 to its open circuit position will have caused the contact 64.2 and 64.3 to close re-establishing the motor circuit. Thus under certain conditions of operation, there may be one complete radiation cycle each time the refrigerator thermostat closes its contacts and each time the thermostat opens its contacts.

I have calculated that in the case of fresh foods stored in a treatment chamber of approximately .5 cu. ft., and having a temperature in the normal refrigeration range of 34–36° F., the storage life can be increased several hundred percent by irradiation of the mass at the rate of .4R per hour. In determining the quantity of radioisotope material to be distributed among the carrier rods 40 or about the ring 50, it must be considered that on the agerage, the refrigeration compressor will cycle about four times per hour. As above noted, there will usually be two operations of the irradiation apparatus for each cycle of operation of the compressor, and the food will be irradiated for approximately 30 seconds for each of the two operations. There will thus be a total of four minutes of radiation during each hour.

It is, of course, obvious that the irradiation mechanism may be made to operate on any predetermined time cycle without reference to the operation of the refrigerator system by merely placing a time-cycle switch in the circuit in substitution for the contacts 58.2 of the thermostat 58 and eliminating the dash-pot solenoid 64.

While there has been described what is a present considered to be the preferred embodiment of the invention, it will be understood that various modifications may be made therein, and it is intended to cover in the appended claims all such modifications as fall within the true spirit and scope of the invention.

I claim:

1. Means for irradiating material with gamma rays, comprising a chamber having walls resistant to gamma ray penetration, means for supporting the material within said chamber in spaced relation to said walls, a mass of gamma-ray emissive material, and means for causing said emissive material to travel about said supported material in a helical path.

2. Apparatus for irradiating articles of food with electromagnetic rays, comprising a chamber for the reception of said articles, said chamber having walls resistant to the passage of said rays, means transparent to said rays for supporting the articles to be treated, carrier means having a body of electromagnetic ray emitting material, means for establishing a home position of said carrier, means for shielding said material in the home position of said carrier to resist passage of said rays into said chamber, electric motor means disposed remote from said treatment chamber to move said carrier within said treatment chamber to cause the articles therein to be irradiated, means to return said carrier to home position, and means to insure return of said carrier to home position in the event of failure of electric power.

3. Apparatus according to claim 2, in which the means for moving the carrier relative to the chamber includes an endless feed screw.

4. Apparatus according to claim 2, in which the means for returning the carrier to home position includes a spring motor which is energized during travel of said carrier from home position to irradiating position.

5. Apparatus according to claim 2, in which the electromagnetic ray emitting material comprises cobalt-60.

6. Apparatus according to claim 2, in which the walls of the treatment chamber include a liquid-filled jacket surrounding said chamber.

7. Apparatus for irradiating a body of material with electromagnetic rays, comprising a treatment chamber having walls and a door resistant to the passage of said electromagnetic rays, means for supporting said material within said chamber in spaced relation to the walls thereof, a carrier for electromagnetic ray-emissive material, means for establishing a home position for said carrier in which the emissive material is shielded from the chamber, an electric motor disposed remote from said chamber, an electric circuit for energizing said motor, means effective upon energization of said motor to cause said carrier to travel from its home position into said chamber to irradiate the body of material within said chamber and to return said carrier to its home position, a normally open switch in series in said motor circuit, and means on said door engaging with said switch upon closure of said door to operate said switch to closed-circuit position and thereby permit operation of said motor.

8. Apparatus for irradiating a body of material with low-intensity gamma rays comprising a treatment chamber having walls and a door resistant to the passage of said rays, means for supporting said material within said chamber in spaced relation to the walls thereof, a carrier for gamma ray-emissive material, means for establishing a home position for said carrier in which the emissive material is shielded from said chamber, an electric motor disposed remote from said chamber, an electric circuit for energizing said motor, means driven by said motor upon energization thereof to cause said carrier to travel from its home position and irradiate said body of material within said treatment chamber and to return said carrier to its home position, a normally closed switch in said motor energizing circuit, means engaging with said switch when the carriage is in home position to move said switch to open circuit position and releasing said switch when the carriage has travelled from its home position, and a manually operable switch in parallel with said first-named switch to energize the motor temporarily to cause the carriage to travel from its home position and thereby cause said first-named switch to assume its normally closed-circuit position and thereafter assume control over the operation of said motor.

9. Apparatus for irradiating a body of material with gamma rays, comprising a treatment chamber having walls and a door resistant to the passage of said rays, means for supporting said material within said chamber, a carrier for gamma ray-emissive material, means for establishing a home position for said carrier in which the emissive material is shielded from said chamber, an electric motor, an electric circuit for energizing said motor, means driven by said motor upon energization thereof to cause said carrier to travel from its home position to a position causing irradiation of said body of material and to return to said home position, switch means responsive to the closing of said chamber door to condition a circuit for operation of said motor, means for completing said circuit for operation of said motor, and latch means responsive to the completion of said motor circuit to secure said door in closed position so long as said motor is energized.

10. Apparatus according to claim 9, in which said latch means includes an electromagnetic latch-holding device in said motor energizing circuit.

11. Apparatus for irradiating a body of material, comprising a treatment chamber, means for supporting said material within said chamber, means including a motor driven refrigerant compressor for refrigerating said chamber, thermostat means for cycling said compressor, a carrier for ray-emissive material, means for establishing a home position for said carrier in which the emissive material is shielded from said chamber, an electric motor, an electric circuit for energizing said motor, means effective upon energization of said motor to cause said carrier to travel within said chamber to irradiate the material therein, switch means operated by said thermostat to condition said electric motor circuit for energizing said motor for each cycling of said refrigeration compressor, and switch means in said electric motor circuit for completing said energizing circuit.

12. Apparatus for irradiating a body of material, comprising a treatment chamber, means for supporting material within said chamber, means including a motor driven refrigerant compressor for refrigerating said chamber, thermostat means for cycling said compressor, a carrier for ray-emissive material, means for establishing a home position for said carrier in which the emissive material is shielded from said chamber, an electric motor, an electric circuit for energizing said motor, means driven by said motor upon energization thereof to cause said carrier to travel within said chamber for irradiating the material therein and as part of the same operating cycle to return to its home position, a normally closed switch in said energizing circuit, means engaging with said switch when the carriage is in home position to move said switch to open circuit position and releasing said switch to its normally closed condition upon disengagement from said switch actuating means following departure of said carriage from home position, and switch means operated by said thermostat temporarily to close a parallel motor energizing circuit for causing said motor to drive said carriage from its home position for closure of the carriage-operated switch, whereby said switch assumes control of said motor circuit.

13. The method of treating fresh foods, to inhibit mold and bacterial increase thereon, comprising placing said foods within a closed chamber in spaced relation to the walls thereof, introducing at least one body of low-intensity ionizing ray emitting material into said chamber and causing said material to traverse substantially to the full length of said chamber in a circular path about said foods and in a manner directing the rays primarily toward said foods, whereby all sides of said foods are directly subjected to low-intensity radiation emanating from said material, and, substantially without interruption of the travel thereof, retracing said material into a compartment insulated from said chamber as respects the transmission of rays thereinto.

14. Means for irradiating material with gamma rays, comprising a first chamber having walls resistant to gamma ray penetration, a second chamber adjacent said first chamber, a gamma ray penetration resistant wall separating said first and second chambers, means within said first chamber to position said material in spaced relation to the walls thereof, a plurality of bodies of gamma ray emissive substance, means supporting said bodies in fixed mutual spaced relation, means including said supporting means for moving said bodies from said second chamber into said first chamber and to return said bodies from said first to said second chamber as part of a continuous travel, pursuant to which said bodies collectively pass about the material to be irradiated to envelop the same in gamma rays emanating from said bodies, means including said supporting means to direct the gamma ray emission from said bodies primarily toward the material to be irradiated, and means carried by said supporting means to supplement the said gamma ray penetration resistant wall in restricting entry of gamma rays into said first chamber when said bodies of ray emitting substance have been returned to said second chamber.

15. Apparatus for irradiating articles of food with electromagnetic rays, comprising a chamber for the reception of said articles, means for supporting said articles in spaced relation to the walls of said chamber, carrier means comprising a ring of material resistant to the passage of electromagnetic rays, said ring being of sufficient inside diameter to pass about the said articles of food, material capable of emitting electromagnetic rays disposed about the inner surface of said ring, means for establishing a position of said carrier means shielding the said ray-emitting material to restrict the passage of rays into said chamber, means for causing said carrier means and the ray-emitting material thereof to traverse said chamber with the carrier means extending about said articles to envelop the articles in electromagnetic rays emitted from said material, and means to return said carrier means to its first-named position relative to said chamber.

References Cited in the file of this patent

UNITED STATES PATENTS

| 1,204,721 | Von Recklinghausen | Nov. 14, 1916 |
| 1,929,910 | Zecher | Oct. 10, 1933 |
| 2,425,672 | Ellner | Aug. 12, 1947 |
| 2,429,217 | Brasch | Oct. 21, 1947 |
| 2,501,174 | Herzog | Mar. 21, 1950 |

FOREIGN PATENTS

| 602,598 | Germany | Sept. 12, 1934 |

OTHER REFERENCES

"Introduction to Modern Physics," Richtmyer et al., McGraw-Hill Book Co., Inc., N.Y., 4th edition (1947), page 555.

AEC Document AECU–1673, September 1951, pages 39–56.

Borst: Abstract of application Serial No. 552,558, publ. Apr. 29, 1952, 657 O.G. 1582.

"Refrigerating Engineer," January 1953, pages 55–57 relied on.

Stang et al.: "Nucleonics," vol. 12, No. 3, March 1954, pages 62–66.